United States Patent [19]

Jung et al.

[11] Patent Number: 4,839,448

[45] Date of Patent: Jun. 13, 1989

[54] SOLUBLE ACRYLATE COPOLYMER CONTAINING CARBOXYL GROUPS, PROCESSES FOR ITS PREPARATION AND COATING AGENTS BASED ON THE ACRYLATE COPOLYMER

[75] Inventors: Werner Jung, Ascheberg; Axel Sievers, Munster, both of Fed. Rep. of Germany

[73] Assignee: BASF Lacke & Farben Akt, Munster, Fed. Rep. of Germany

[21] Appl. No.: 60,243

[22] PCT Filed: Aug. 20, 1986

[86] PCT No.: PCT/EP86/00488

§ 371 Date: May 29, 1987

§ 102(e) Date: May 29, 1987

[87] PCT Pub. No.: WO87/02041

PCT Pub. Date: Apr. 9, 1987

[30] Foreign Application Priority Data

Sep. 30, 1985 [DE] Fed. Rep. of Germany ....... 3534858

[51] Int. Cl.$^4$ .................. C08F 22/40; C08F 34/02
[52] U.S. Cl. .................. 526/262; 526/265; 526/271; 526/273; 526/312; 526/318
[58] Field of Search ............ 526/278, 312, 273, 318, 526/271, 262, 265

[56] References Cited

U.S. PATENT DOCUMENTS 4,274,933  6/1981  Kamada et al. ............ 526/277

FOREIGN PATENT DOCUMENTS 0103199  3/1984  European Pat. Off. ............ 526/278

Primary Examiner—Joseph L. Schofer
Assistant Examiner—N. Sarofim
Attorney, Agent, or Firm—Kenyon & Kenyon

[57] ABSTRACT

Soluble acrylate copolymer containing carboxyl groups, processes for its preparation and coating agents based on the acrylate copolymer.

The invention relates to a a soluble acrylate copolymer which can be obtained by copolymerization of more than 3 to 30% by weight, based on the total weight of all the monomers, of a monomer with at least 2 polymerizable, olefinically unsaturated double bonds, monomers which carry functional groups and other monomers with a polymerizable double bond, the acid number of the acrylate resin being 15 to 200. The invention furthermore relates to processes for the preparation of the acrylate copolymers and coatings based thereon and based on polyepoxides.

34 Claims, No Drawings

SOLUBLE ACRYLATE COPOLYMER CONTAINING CARBOXYL GROUPS, PROCESSES FOR ITS PREPARATION AND COATING AGENTS BASED ON THE ACRYLATE COPOLYMER

The invention relates to a soluble acrylate copolymer which can be obtained by copolymerization of monomers with at least two polymerizable, olefinically unsaturated double bonds, monomers which carry functional groups and other polymerizable monomers with an olefinically unsaturated double bond, the acrylate copolymer containing carboxyl groups.

An acrylate copolymer which has been obtained by copolymerization of 10 to 95% by weight of t-butyl acrylate, 0.1 to 3% by weight of polyfunctional monomers, such as, for example, trimethylolpropane triacrylate, 1 to 30% by weight of comonomers with functional crosslinkable groups and 0 to 80% by weight of other polymerizable, ethylenically unsaturated monomers is known from the genus-determining European Patent A-103,199. Monomers containing carboxyl groups, such as acrylic acid and methacrylic acid, are mentioned, inter alia, as comonomers with a functional crosslinkable group.

A coating composition which contains an acrylate copolymer containing carboxyl groups and branched by copolymerization of monomers with several ethylenically unsaturated bonds and a polyepoxide as a crosslinking agent is furthermore known from European Patent A-103,199. The branched acrylate copolymers described lead to coatings with a high resistance to weathering, in particular a good resistance to humidity, which is to be attributed to the content of copolymerized t-butyl acrylate on the one hand and to the content of copolymerized monomers with several olefinically unsaturated bonds.

A reactive hardenable binder mixture on the basis of particular polycarboxylic acid units based on polymerization and/or condensation products, carboxyl groups being formed, for example, by addition of cyclic carboxylic acid anhydrides onto OH-acrylates, and on the basis of aliphatic or cycloaliphatic epoxide compounds is known from European Patent B-51,275. The advantage of the hardenable binder mixture is that, in addition to the binder, a catalyst for the carboxyl-epoxy crosslinking is present in the form of metal salts, so that an external catalyst can be dispensed with.

A composition which hardness even at room temperature and consists of polyepoxides and polymers which contain carboxyl groups and tertiary amino groups and are formed by reaction of vinyl polymers containing acid anhydride groups and carboxyl groups with compounds which contain at least one active hydrogen capable of reaction with acid anhydrides and at least one tertiary amino group, such as, for example, tertiary aminoalcohols, is known from European Patent A-123,793. The compositions described have the advantage that they harden even at room temperature and have a high stability towards gasoline, water and alkalis, and that no undesirable discoloration attributable to tertiary amino compounds arise.

Japanese Preliminary Published Specification No. 53,145/79 describes compositions based on copolymers with tertiary amino groups, carboxyl groups and phosphoric acid groups and on aliphatic polyepoxides. The compositions harden at relatively low temperatures and lead to films with a good stability towards solvents and resistance to weathering.

Compositions of acrylate resins and di- and polyepoxides are known from German Offenlegungsschrift 2,635,177. $\alpha,\beta$-Ethylenically unsaturated carboxylic acids are copolymerized into the acrylate resins, and the resins have an acid number of 70 to 250. The compositions have a high solids content and show good results in respect to mechanical properties, stability towards chemicals and solvents and corrosion resistance.

A coating composition which is obtainable by mixing acrylate copolymers of acrylic acid esters, monomers containing carboxyl groups and acrylic monomers containing tertiary nitrogen, such as, for example, diethylaminoethyl acrylate, with polyepoxides is known from Japanese Preliminary Published Specification No. 76,338/77. The coating compositions can harden at low temperatures and have a high solids content.

A process for the production of a coating in which an acrylate copolymer formed by copolymerization of acrylic monomers with a tertiary amino group, acrylic or methacrylic acid esters and, if appropriate, other monomers, a polyepoxide component and a carboxylic acid activated by double bonds and/or hydroxyl groups are mixed and the mixture is applied to the substrate is known from Japanese Preliminary Published Specification No. 219,267/83. The mixtures harden at room temperature or somewhat elevated temperature, and the film formed has good physical properties, a good stability towards gasoline and good resistance to weathering. An advantage of the process described in Japanese Preliminary Published Specification No. 219,267/83 is that no brown coloration of the acrylate solution due to the tertiary amino groups occurs on prolonged storage, this being achieved by addition of the activated carboxylic acid.

The preparation of a tertiary amino group in an acrylate copolymer is known from European Patent B-13,439. The tertiary amino group is obtained by reaction of glycidyl groups incorporated into the acrylate copolymer with amines which have a secondary amino group and at least one secondary hydroxyl group.

The object of the present invention was to improve the properties of coating agents and coatings based on epoxy-carboxyl crosslinking in respect of stability towards long-term exposure to chemicals and solvents, in respect of stability towards gasoline and elasticity of the coatings obtained on the basis of the coating agent, the gloss and the corrosion resistance and in respect of stability towards water and steam. A further requirement imposed on the compositions is that, if appropriate, they harden at room temperature or at slightly elevated temperatures and can therefore be used, for example, in automobile refinishing. It should furthermore be possible, for economic reasons, to achieve a high solids content of the hardenable coating agents at a relatively low viscosity.

This object is achieved, surprisingly, by a soluble acrylate copolymer which has a higher content of copolymerized monomers with several ethylenically unsaturated bonds than the acrylate resins described in European Patent A-103,199. In comparison with linear acrylate resins and the acrylate resins from European Patent A-103,199, a lower viscosity can be achieved at a relatively high solids content with the acrylate copolymers according to the invention. Only by the reaction conditions according to the invention during copolymerization can amounts of more than 3% by weight of polyunsaturated monomers be incorporated into the acrylate resin. The functional groups of the acrylate resin become more reactive due to the highly crosslinked structure of the copolymer, which provides a great advantage.

The object on which the invention is based is achieved by the abovementioned soluble acrylate copolymer, which is characterized in that more than 3 to 30% by weight, based on the total weight of the monomers, of a monomer with at least two polymerizable, olefinically unsaturated double bonds are copolymerized into the acrylate copolymer and the acid number of the acrylate copolymer is 15 to 200, preferably 30 to 120. According to the invention, the acid groups can be realized in the acrylate copolymer in various ways.

The invention relates to a soluble acrylate copolymer which is characterized in that it can be obtained from (a1) more than 3 to 30% by weight, preferably 5 to 25% by weight, of a monomer with at least two polymerizable, olefinically unsaturated double bonds, (a2) 3 to 30% by weight, preferably 5 to 20% by weight, of a monomer containing carboxyl groups and (a3) 40 to 93% by weight of other monomers with a polymerizable, olefinically unsaturated double bond, the sum of a1, a2 and a3 being 100% by weight.

Compounds of the general formula

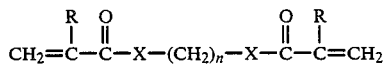

in which: R=H or $CH_3$, X=O, NR' or S, where R'=H, alkyl or aryl, and n=2 to 8, can advantageously be used as component a1.

Examples of such compounds are hexanediol diacrylate, hexanediol dimethacrylate, glycol diacrylate, glycol dimethacrylate, butanediol diacrylate, butanediol dimethacrylate, hexamethylenebismethacrylamide, trimethylolpropane triacrylate, trimethylolpropane trimethacrylate and similar compounds.

It is of course also possible to use combinations of the polyunsaturated monomers.

Other possible components a1 are reaction products of a carboxylic acid with a polymerizable, olefinically unsaturated double bond and glycidyl acrylate and/or glycidyl methacrylate. It is also possible to use a polycarboxylic acid or unsaturated monocarboxylic acid esterified with an unsaturated alcohol containing a polymerizable double bond as component a1. Diolefins, such as divinylbenzene, can furthermore be employed. Reaction products of a polyisocyanate with alcohols or amines containing unsaturated, polymerizable double bonds are also employed as monomers with at least two polymerizable, olefinically unsaturated double bonds. An example which may be mentioned here is the reaction product of one mole of hexamethylene diisocyanate with 2 moles of allyl alcohol. The monomers containing several ethylenically unsaturated bonds can advantageously be diesters of polyethylene glycol and/or polypropylene glycol with an average molecular weight of less than 1,500, preferably less than 1,000, and acrylic acid and/or methacrylic acid.

$\beta$-Carboxyethyl acrylate is particularly suitable as component (a2), and acrylic acid, methacrylic acid, itaconic acid, crotonic acid, aconitic acid, maleic acid and fumaric acid or half-esters thereof are furthermore suitable.

The choice of component (a3) depends largely on the desired properties of the acrylate copolymer in respect of elasticity, hardness, compatibility and polarity. These properties can in part be controlled with the aid of the known glass transition temperatures of the monomers. The monomers can be chosen from the group comprising styrene, vinyltoluene, alkyl esters of acrylic acid and of methacrylic acid, alkoxyethyl acrylates and aryloxyethyl acrylates and the corresponding methacrylates and esters of maleic and fumaric acid.

Monomers which may be mentioned are methyl acrylate, ethyl acrylate, propyl acrylate, butyl acrylate, isopropyl acrylate, isobutyl acrylate, pentyl acrylate, isoamyl acrylate, hexyl acrylate, 2-ethylhexyl acrylate, octyl acrylate, 3,5,5-trimethylhexyl acrylate, decyl acrylate, dodecyl acrylate, hexadecyl acrylate, octadecyl acrylate, octadecenyl acrylate, pentyl methacrylate, isoamyl methacrylate, hexyl methacrylate, 2-ethylbutyl methacrylate, octyl methacrylate, 3,5,5-trimethylhexyl methacrylate, decyl methacrylate, dodecyl methacrylate, hexadecyl methacrylate, octadecyl methacrylate, butoxyethyl acrylate, butoxyethyl methacrylate, methyl methacrylate, ethyl methacrylate, propyl methacrylate, isopropyl methacrylate, butyl methacrylate, cyclohexyl acrylate, cyclohexyl methacrylate, acrylonitrile, methacrylonitrile, vinyl acetate, vinyl chloride and phenoxyethyl acrylate. Other monomers can be used as long as they do not lead to undesirable properties in the copolymer.

Monomers containing hydroxyl groups, for example hydroxyalkyl esters of acrylic and/or methacrylic acid, can also be employed as component (a3). It is possible to employ 0.1 to 5% by weight, based on the total weight of all the monomers, of monomers with phosphoric acid groups, that is to say, for example, phosphoric acid esters with polymerizable double bonds, as other monomers with a polymerizable olefinically unsaturated double bond.

It is particularly advantageous if the acrylate copolymer with an acid number of 15 to 200, preferably 30 to 120, but built into it monomers which contain groups which catalyze subsequent crosslinking of the acrylate copolymer containing carboxyl groups with epoxide groups, that is to say, for example, tertiary amino groups.

The invention also relates to a soluble acrylate copolymer, which is characterized in that it can be obtained from (a1) more than 3 to 30% by weight, preferably 5 to 25% by weight, of a monomer with at least two polymerizable, olefinically unsaturated double bonds, di- and polyesters of di- and polyols with acrylic acid being excluded, (a2) 3 to 30% by weight, preferably 5 to 20% by weight, of a monomer containing carboxyl groups, (a3) 0.1 to 20% by weight, preferably 1 to 14% by weight, of a tertiary amine with a polymerizable, olefinically unsaturated double bond, (a4) 0 to 40% by weight, preferably 5 to 25% by weight, of a monomer containing hydroxyl groups and (a5) 0 to 80% by weight of other monomers with a polymerizable, olefinically unsaturated double bond, the sum of components a1, a2, a3, a4 and a5 being 100% by weight.

Compounds of the general formula

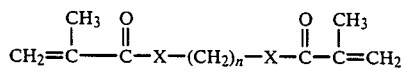

in which: X=O, NR or S, where R=H, alkyl or aryl, and n=2 to 8, can advantageously be used as component a1.

Component a1 can be a reaction product of a carboxylic acid with a polymerizable, olefinically unsaturated double bond, excluding acrylic acid, and glycidyl methacrylate. Polycarboxylic acids or unsaturated monocarboxylic acids esterified with an unsaturated alcohol containing a polymerizable double bond are furthermore suitable, derivatives of acrylic acid being excluded. The use of polyolefins, such as, for example, divinylbenzene, is also advantageous. Components a1 are advantageously selected from products which are prepared from polyisocyanates with alcohols or amines containing unsaturated, polymerizable double bonds. Diesters of polyethylene glycol and/or polypropylene glycol with an average molecular weight of less than 1,500, preferably of less than 1,000, and methacrylic acid are furthermore suitable.

Examples of ethylenically unsaturated compounds with a tertiary amino group, that is to say of component a3, are N,N'-dimethylaminoethyl methacrylate, N,N'-diethylaminoethyl methacrylate, 2-vinylpyridine and 4-vinylpyridine, vinylpyrroline, vinylquinoline, vinylisoquinoline, N,N'-dimethylaminoethyl vinyl ether and 2-methyl-5-vinylpyridine.

If appropriate, monomers containing hydroxyl groups can be employed. Examples which may be mentioned are hydroxyalkyl esters of acrylic and methacrylic acid, such as, for example, hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. The other monomers with a polymerizable, olefinically unsaturated double bond are chosen from the group already mentioned above. In this case also, if appropriate, it is advantageous for 0.1 to 5% by weight, based on the total weight of all the monomers, of monomers, with phosphoric acid groups to be employed as other monomers with a polymerizable double bond.

According to the invention, the soluble acrylate copolymer with an acid number of 15 to 200, preferably 30 to 120, can be obtained from (a1) more than 3 to 30% by weight, preferably 5 to 25% by weight, of a monomer with at least two polymerizable, olefinically unsaturated double bonds, di- and polyesters of di- and polyols with acrylic acid being excluded, (a2) 0.1 to 20% by weight, preferably 1 to 14% by weight, of a tertiary amine with a polymerizable, olefinically unsaturated double bond.

(a3) 5 to 40% by weight, preferably 10 to 30% by weight, of monomers containing hydroxyl groups, (a4) 0 to 80% by weight of other polymerizable monomers with an olefinically unsaturated double bond and (a5) cyclic carboxylic acid anhydrides, the sum of a1, a2, a3 and a4 being 100% by weight.

Compounds of the general formula

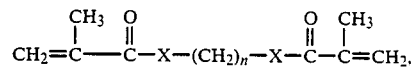

in which: X=O, NR' or S, where R'=H, alkyl or aryl, and n=2 to 8, can advantageously be used as component a1.

Examples of compounds with several ethylenically unsaturated bonds are hexanediol dimethacrylate, glycol dimethacrylate, butanediol dimethacrylate, trimethylolpropane trimethacrylate, divinylbenzene and similar compounds. The ethylenically unsaturated compounds which have already been mentioned can also advantageously be used, provided that they are not di- or polyesters of di- and polyols with acrylic acid.

Possible polymerizable tertiary amines are those already mentioned above.

Hydroxyalkyl esters of acrylic and/or methacrylic acid with a primary hydroxyl group, for example hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates, and hydroxyalkyl esters with a secondary OH group, such as 2-hydroxypropyl acrylate, 2-hydroxybutyl acrylate, 3-hydroxybutyl acrylate and the corresponding methacrylates, are suitable as component a3.

Reaction products of acrylic acid and/or methacrylic acid with the glycidyl ester of a carboxylic acid with a tertiary α-carbon atom are also possible as component a3.

The choice of component a4 is not particularly critical and depends on the desired properties of the acrylate copolymer. It should be mentioned that monomers containing carboxyl groups can also be employed as component a4.

Examples of component a5 are phthalic anhydride, tetrahydrophthalic anhydride, hexahydrophthalic anhydride, succinic anhydride and halogenated derivatives thereof. Maleic anhydride can also be used as component a5, but it should be ensured that no solvents which react with maleic anhydride under catalysis by the tertiary nitrogen groups are employed. Examples of solvents which cannot be used are acetone, methyl ethyl ketone, butyl acetate and other acetylating solvents. Solvents which can be used are hydrocarbons and polar solvents, such as dimethylformamide, dimethylacetamide, N-methylpyrrolidone etc.

The present invention also relates to a soluble acrylate copolymer with an acid number of 15 to 200, which can be obtained from (a1) more than 3 to 30% by weight, preferably 5 to 25% by weight, of monomers with at least two polymerizable, olefinically unsaturated double bonds, (a2) 1 to 25% by weight, preferably 3 to 15% by weight, of monomers with cyclic carboxylic acid anhydride groups, (a3) 45 to 80% by weight of other polymerizable monomers with an olefinically unsaturated double bond, the sum of a1, a2 and a3 being 100% by weight, and (a4) compounds which contain both at least one hydrogen which can react with acid anhydride groups and at least one tertiary amino group, it also being possible for some of the carboxylic acid anhydride groups to be reacted with a monofunctional compound with active hydrogen.

The monomers containing several ethylenically unsaturated bonds which have been mentioned above, including the di- and polyesters of di- and polyols with acrylic acid, are suitable as component a1.

Examples of monomers with cyclic carboxylic acid anhydride groups are maleic anhydride and itaconic anhydride.

The choice of component a3 depends on the desired properties of the acrylate copolymer. It should be mentioned that in the present case monomers containing carboxyl groups, that is to say, for example, acrylic acid or methacrylic acid, are also suitable.

Alcohols which contain a tertiary amino group and primary or secondary amines with a tertiary amino group are advantageously employed as component a4. The reactive hydrogen of component a4 can originate from a hydroxyl group, a primary or secondary amino group or a thiol group.

Examples of alcohols with tertiary amino groups are adducts of secondary amines and epoxide compounds. Examples of secondary amines are dimethylamine, diethylamine, dipropylamine, dibutylamine, morpholine and pyrrolidine.

Examples of suitable epoxide compounds are ethylene oxide, propylene oxide, butylene oxide, styrene oxide and cyclohexane oxide.

Suitable alcohols with tertiary amino groups which are obtined by reaction of secondary amines with epoxide compounds are dimethylaminoethanol, diethylaminoethanol, di-n-propylaminoethanol, diisopropylaminoethanol, di-n-butylaminoethanol, N-(2-hydroxyethyl)-morpholine, N-(2-hydroxyethyl)piperidine, N-(2-hydroxyethyl)pyrrolidone, N-(2-hydroxyethyl)azeridine (sic), N,N'-dimethyl-2-hydroxypropylamine, N,N'-diethyl-2-hydroxypropylamine, triethanolamine and tripropanolamine.

Other examples of alcohols containing tertiary amino groups are vinyl polymers which have both a tertiary amino group and a hydroxyl group in the side chain and can be obtained by copolymerization of the abovementioned (meth)acrylate monomers containing tertiary amino groups with monomers containing OH groups, such as, for example, β-hydroxyethyl (meth)acrylate.

Examples of the primary or secondary amines which contain a tertiary amino group are N,N'-dialkyl-1,3-propylenediamines, such as, for example, N,N'-dimethyl-1,3-propylenediamine and N,N'-diethyl-1,3-propylenediamine, and N,N'-dialkyl-1,4-tetramethylenediamines, such as, for example, N,N'-dimethyl-1,4-tetramethylenediamine and N,N'-diethyl-1,4-tetramethylenediamine. N,N'-Dialkyl-1,6-hexamethylenediamines and N-alkylpiperazines as well as 2-aminopyridine, 4-aminopyridine and N-alkylaminopyridine (sic) are furthermore suitable.

It should be mentioned that some of the carboxylic acid anhydride groups can also be reacted with a monofunctional compound with active hydrogen, such as, for example, alcohols.

The present invention furthermore relates to an acrylate copolymer which has an acid number of 15 to 200, preferably 30 to 120, and can be obtained from (a1) more than 3 to 30% by weight, preferably 5 to 25% by weight, of monomers with at least two polymerizable, olefinically unsaturated double bonds, (a2) 1 to 30% by weight of glycidyl esters of ethylenically unsaturated carboxylic acids and/or glycidyl ethers of olefinically unsaturated compounds, (a3) 40 to 95% by weight of other polymerizable monomers with an olefinically unsaturated double bond, the sum of all the monomers being 100% by weight, and (a4) amines with a secondary amino group or di- or polyamines with at least one tertiary amino group and one primary or secondary amino group and/or (a5) carboxylic acid which contain a tertiary nitrogen atom and (a6) cyclic carboxylic acid anhydrides.

The monomers with several ethylenically unsaturated bonds which have already been mentioned are suitable as component a1.

Examples of component (a2) are glycidyl esters of acrylic acid or of methacrylic acid and allyl and vinyl glycidyl ethers, glycidyl-vinyl esters or glycidyl-allyl esters, such as glycidyl vinyl phthalate and glycidyl allyl phthalate.

The choice of component a3 depends on the desired properties of the acrylate copolymer and can be made from the group already mentioned above. However, no monomers containing carboxyl groups or amino groups should be used as component a3, since these react with the oxirane group of component a2. The content of monomers containing hydroxyl groups should be as low as possible. If hydroxyl groups are necessary to achieve a certain polarity in the copolymer, monomers with secondary OH groups should be preferred.

Examples of component a4 are imidazole, aminopyridine, N-alkylaminopyridine (sic), ethylpiperazine and dibutylamine.

Examples of component a5 are 3- and 4-dimethylaminobenzoic acid, picolinic acid and dimethylaminosalicylic acid.

Examples which may be mentioned of component a6 are phthalic anhydride, tetrahydrophthalic anhydride, hexahydrophthalic anhydride, succinic anhydride and halogenated derivatives thereof.

The invention also relates to processes for the preparation of the soluble acrylate copolymers according to claim 2, 3, 4 or 5, which are characterized in that, for preparation of the copolymers, the monomers are copolymerized in an organic solvent at 70° C. to 130° C., preferably at 80° C. to 120° C., using at least 0.5% by weight, preferably at least 2.5% by weight, based on the total weight of the monomers, of a polymerization regulator and using polymerization initiators to give a pre-crosslinked, non-gelled product.

The invention also relates to a process for the preparation of the soluble acrylate copolymer according to claim 6, which is characterized in that, for preparation of the copolymer, the monomers are first copolymerized in an organic solvent at 70° C. to 130° C., preferably at 80° C. to 120° C., using at least 0.5% by weight, preferably at least 2.5% by weight, based on the total weight of the monomers, of a polymerization regulator and using polymerization initiators, to give a pre-crosslinked, nongelled product and, when the copolymerization has ended, the reaction with the cyclic acid anhydrides is carried out.

The invention furthermore relates to a process for the preparation of the soluble acrylate copolymer according to claim 7, 8 or 9, which is characterized in that, for preparation of the copolymer, the monomers are first copolymerized in an organic solvent at 70° C. to 130°

C., preferably at 80° C. to 120° C., using at least 0.5% by weight, preferably at least 2.5% by weight, based on the total weight of the monomers, of a polymerization regulator and using polymerization initiators, to give a pre-crosslinked, non-gelled product and, when the copolymerization reaction has ended, the reaction of the copolymer with the compounds which contain at least one hydrogen capable of reaction with acid anhydride groups and at least one tertiary amino group and, if appropriate, with monofunctional compounds with active hydrogen is carried out.

The present invention moreover relates to a process for the preparation of the soluble acrylate copolymer according to claim 10, which is characterized in that, for preparation of the copolymer, the monomers are first copolymerized in an organic solvent at 70° C. to 130° C., preferably at 80° C. to 120° C., using at least 0.5% by weight, preferably at least 2.5% by weight, based on the total weight of the monomers, of a polymerization regulator and using polymerization initiators, to give a pre-crosslinked, non-gelled product and, when the copolymerization reaction has ended, the reaction with the di- or polyamines with at least one tertiary amino group and at least one primary or secondary amino group and/or with carboxylic acids which contain a tertiary nitrogen and with the cyclic carboxylic acid anhydrides is carried out.

It should be remembered that a pre-crosslinked but non-gelled copolymer is obtained. Surprisingly, a clear, transparent, non-gelled solution of a branched copolymer can be prepared under suitable polymerization conditions. Pre-crosslinking of the copolymer molecules which, because of the particular reaction conditions according to the invention, nevertheless does not lead to gelled products can be brought about by using monomers with at least two ethylenically unsaturated groups.

The polymerization is carried out so that a solution of the polymer with a solids content of 40 to 65% by weight results. The solids content depends on the content of copolymerized monomers containing several ethylenically unsaturated bonds. If this content is low, polymerization can be carried out at higher solids contents.

It is furthermore necessary to use suitable initiators and, depending on the content of polyfunctional monomer, at least 0.5% by weight, but preferably at least 2.5% weight, of a polymerization regulator. The choice of initiator depends on the content of polyfunctional monomers employed. If the content is low, the initiators customary for such temperatures, such as, for example, peroxyesters, can be used. At a higher content of polyfunctional monomers, initiators such as, for example, azo compounds are preferably employed. After the polymerization, the polymer solution is concentrated to the desired solids content, preferably to solids contents of 60% by weight, by distilling off the solvent. The clear copolymer solutions thus obtained have a viscosity of 0.4 to 10 dPa.s when adjusted to a solids content of 50% by weight.

The polymerization is carried out in the presence of an organic solvent. Examples are ethanol, isopropanol, n-propanol, n-butanol, isobutanol, t-butanol, methyl, ethyl, propyl and butyl acetate, acetone, methyl ethyl ketone, xylene and toluene.

The polymerization can also be carried out according to claim 23 in the presence of a chlorinated polyolefin. Acrylate resin solutions which, after crosslinking according to the invention, guarantee good adhesion to non-metallic substrates, such as, for example, plastics, result.

Compounds containing mercapto groups are preferably suitable as polymerization regulators, mercaptoethanol being particularly preferably employed. Other possible regulators are, for example, t-dodecylmercaptan, phenylmercaptan, octyldecylmercaptan, butylmercaptan and thiocarboxylic acids, such as, for example, thiolactic acid.

It should be ensured that no hydroxymercaptans or mercaptans with primary SH groups are employed as the polymerization regulator in the preparation of the acrylate copolymer according to claim 7, 8, or 9. When choosing the polymerization regulator for the preparation of the acrylate according to claim 10, it should be ensured that no thiocarboxylic acids are used.

The invention also relates to a coating agent containing, as the essential binder,
(A) an acrylate copolymer prepared by the processes according to claims 24 to 31 and
(B) a compound containing at least two epoxide groups per molecule, the ratio of A to B being chosen to that the ratio of the acid groups of A to the epoxide groups of B is in the range from 0.5:3 to 2:0.5, and a crosslinking catalyst being used if appropriate.

Examples of compounds with at least two epoxide groups per molecule are condensation products of epichlorohydrin and bisphenol A, cycloaliphatic bis-epoxides which correspond to the formulae (I) and (II):

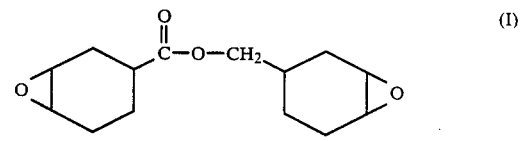

(I)

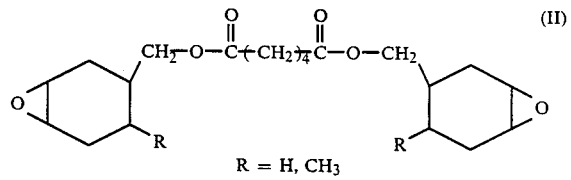

(II)

R = H, CH₃ and epoxidized polybutadienes which are formed by reaction of commercially available polybutadiene oils with peracids or organic acid/$H_2O_2$ mixtures, novolaks containing epoxide groups, glycidyl ethers of a polyhydric alcohol, for example ethylene glycol diglycidyl ether, glycerol polyglycidyl ether, sorbitol polyglycidyl ether, trimethylolpropane polyglycidyl ether and pentaerythritol polyglycidyl ether, and low molecular weight acrylate resins with lateral oxirane groups.

If appropriate, a crosslinking catalyst can be used. Tertiary amines, quaternary ammonium compounds, such as, for example, benzyltrimethylammonium hydroxide and benzyltrimethylammonium chloride, particular chromium compounds and tin compounds are especially suitable here. The use of a crosslinking catalyst is of course unnecessary in most cases where tertiary amino groups are already incorporated into the acrylate copolymer. Lower stoving temperatures and shorter stoving times are achieved by using an internal or external crosslinking catalyst. The crosslinking catalyst is preferably used in an amount of 0.5 to 10% by weight, based on the weight of the di- or polyepoxide component.

The invention also relates to a process for the preparation of a coating agent according to claim 32 or 33, which is characterized in that, for preparation of the coating agent, an acrylate copolymer (A) is prepared according to claim 24 to 31 and this is processed with (B), a compound which contains at least two epoxide groups per molecule, if appropriate also using a crosslinking catalyst, and with organic solvents, if appropriate pigments and customary auxiliaries and additives, by mixing and if appropriate dispersing, to give a coating composition, the ratio of A to B being chosen so that the ratio of the acid groups of A to the epoxide groups of B is in the range from 0.5:3 to 2:0.5.

The coating agents according to the invention can be hardened at low temperatures, for example at temperatures of 20° to 80° C., and are therefore employed, in particular, in repair lacquering on motor vehicles. The coating agents can of course also be stoved at temperatures higher than 80° C.

The invention also relates to a process for the production of a coating, in which a coating agent according to claim 32 or 33 is applied in the form of a film by spraying, flooding, dipping, rolling, knife-coating or brushing to a substrate, and the film is hardened to a firmly adhering coating. The invention also relates to substrates coated by the process according to the invention.

The coatings according to the invention have outstanding properties in respect of stability towards long-term exposure to chemicals and solvents, and in respect of stability towards gasoline, elasticity, gloss, corrosion resistance and stability towards water and steam. If appropriate, the coating agents harden at low temperatures and can therefore be used, for example, in car repair lacquering. It is furthermore possible to achieve a high solids content of the hardenable coating agents at a relatively low viscosity, compared with linear acrylate copolymers and with acrylate resins with a lower content of copolymerized monomers with several ethylenically unsaturated bonds.

The invention is illustrated below in more detail with the aid of embodiment examples:

(A) PREPARATION OF COPOLYMERS ACCORDING TO THE INVENTION

(Binder A)

In the following examples, unless indicated otherwise, all percentage data relate to percentages by weight and all the parts quoted relate to parts by weight. The solids contents were determined in a circulating air oven after 1 hour at 130° C. The viscosities were determined on a ball/plate viscometer.

Acrylate resin I

The following are taken in a 3 l stainless steel kettle:
212 parts of Solvenon PM (1-methoxypropan-2-ol),
212 parts of butyl acetate 98/100,
0.16 part of hyperphosphorous acid (50% in $H_2O$).

The mixture is heated to 110° C. and the following components are metered in uniformly from 2 feed vessels in the course of 3 hours:

Feed 1

160 parts of styrene
160 parts of hexanediol dimethacrylate
80 parts of β-carboxyethyl acrylate
120 parts of n-butyl acrylate
200 parts of t-butyl acrylate
52 parts of thiolactic acid

Feed 2

80 parts of 4-vinylpyridine

The following components are metered in uniformly from feed vessel 3 in the course of 4 hours:

Feed 3

32 parts of azobisisobutyronitrile
230 parts of Solvenon PM (1-methoxypropan-2-ol)
230 parts of butyl acetate 98/100

All 3 feeds are started at the same time. When the initiator feed has ended, after-polymerization is carried out for a further 2 hours.

Acrylate resin solution I has a solids content (2 hours at 100° C.) of 50.7%, a viscosity (23° C., original) of 6.1 dPa.s and an acid number of 67 (mg of KOH/g of solid resin).

Acrylate resin II

The process and feed times are as for acrylate resin I,

Initial mixture 197.0 parts of butyl acetate 98/100
197.0 parts of 1-methoxyprop-2-yl acetate

Feed 1

140 parts of styrene
140 parts of butanediol dimethacrylate
105 parts of n-butyl acrylate
175 parts of t-butyl acrylate
70 parts of 4-hydroxybutyl acrylate
31.5 parts of mercaptoethanol

Feed 2

70 parts of 4-vinylpyridine

Feed 3

25.2 parts of azobisisobutyronitrile
181.3 parts of butyl acetate 98/100
181.3 parts of 1-methoxyprop-2-yl acetate Feed 1+2, 3 hours, Feed 3, 4 hours, followed by after-polymerization at 110° C. for 3 hours.

90.8 parts of succinic anhydride are added to the acrylate resin solution and the mixture is kept at 120° C. for 6 hours, with stirring. The solution of the addition product of succinic anhydride on the OH-acrylate has an acid number of 71, a viscosity of 6 dPa.s and a solids content of 52.2%.

Acrylate resin solution III

The following are taken in a 3 l stainless steel kettle:
195 parts of butyl acetate 98/100
195 parts of 1-methoxyprop-2-yl acetate The mixture is heated up to 112° C. and feeds 1 and 2 are metered in uniformly in the course of 3 hours:

Feed 1

140 parts of styrene
140 parts of hexanediol dimethacrylate
70 parts of butanediol monoacrylate
105 parts of n-butyl acrylate
175 parts of t-butyl acrylate
31.5 parts of mercaptoethanol Feed 2

70 parts of 4-vinylpyridine

Feed 3 is metered in uniformly in the course of 4.25 hours, feeds 1, 2 and 3 being started simultaneously.

Feed 3

181.6 parts of butyl acetate 98/100
181.6 parts of 1-methoxyprop-2-yl acetate
25.2 parts of azobisisobutyronitrile After the end of feed 3, after-polymerization is carried out at 112° C. for a further 2 hours, 81.4 parts of succinic anhydride are then added and the mixture is kept at 120° C. for 6 hours, with stirring. The resulting clear acrylate resin solution has a solids content of 52.5%, an acid number of 68 and a viscosity of 6.8 dPa.s.

Acrylate resin solution IV

The following components are taken and heated up to 110° C. in a 3 l stainless steel kettle:

Initial mixture 235 parts of Solvenon PM
235 parts of butyl acetate 98/100
0.16 part of hyperphosphorous acid The following components are metered in uniformly in the course of 3 hours:

Feed 1

140 parts of styrene
182 parts of butanediol dimethacrylate
133 parts of n-butyl acrylate
175 parts of t-butyl acrylate
70 parts of thiolactic acid Feed 2

70 parts of 4-vinylpyridine

The following components are metered in uniformly in the course of 4 hours:

Feed 3

161.2 parts of Solvenon PM
161.2 parts of butyl acetate 98/100
22.4 parts of azobisisobutyronitrile Feeds 1, 2 and 3 are started uniformly, the temperature is kept at 110° C. during the polymerization and, when feed 3 has ended, after-polymerization is carried out for 2 hours. The resulting clear acrylate resin solution has a viscosity of 2.1 dPa.s, a solids content of 48.5% and an acid number of 52.

Acrylate resin solution V

The following components are taken in a 3 l stainless steel kettle:

Initial mixture 266 parts of butyl acetate 98/100
266 parts of xylene

The initial mixture is heated up to 112° C. and feeds 1 and 2 are metered in uniformly at 112° C. in the course of 3 hours.

Feed 1

70 parts of butyl methacrylate
105 parts of butanediol diacrylate
175 parts of styrene
210 parts of t-butyl acrylate
70 parts of 2-ethylhexyl acrylate
42 parts of tert.-dodecylmercaptan Feed 2

70 parts of maleic anhydride
70 parts of butyl acetate 98/100
70 parts of xylene Feed 3 is metered in uniformly in the course of 3.5 hours, all feed being started simultaneously.

Feed 3

23.8 parts of 2,2'bis-azo(2-methylbutyronitrile)
47.6 parts of butyl acetate 98/100
47.6 parts of xylene When feed 3 has ended, after-polymerization is carried out at 114° C. for 2 hours. The acrylate resin solution has a solids content of 49% and a viscosity of 3.1 dPa.s.

To this acrylate resin solution, 53.6 parts of 2-aminopyridine
109 parts of 2-methoxyprop-2-yl acetate are added and an addition reaction is carried out with the maleic anhydride copolymer at 80° C. The reaction has ended after 3.5 hours at 80° C. and the clear and colorless acrylate resin solution has a viscosity of 9.5 dPa.s, an acid number of 57, an amine equivalent weight of 1400±20 and a solids content of 49.4%.

Acrylate resin solution VI

The following are taken in a 3 l stainless steel kettle:

Initial mixture 197 parts of 1-methoxyprop-2-yl acetate
197 parts of butyl acetate The initial mixture is heated up to 110° C. and feeds 1 and 2 are metered in uniformly in the course of 3 hours.

Feed 1

140 parts of styrene
140 parts of butanediol dimethacrylate
70 parts of butanediol monoacrylate
105 parts of n-butyl acrylate
175 parts of t-butyl acrylate
31.5 parts of mercaptoethanol Feed 2

70 parts of imidazoylethyl methacrylate

Feed 3

25.2 parts of 2,2'bisazobutyronitrile
181.3 parts of butyl acetate 98/100
181.3 parts of 1-methoxyprop-2-yl acetate Feed 3 is metered in uniformly in the course of 4 hours. Feeds 1, 2 and 3 are started simultaneously, and the temperature is kept at 110° C. during the polymerization. When feed 3 has ended, after-polymerization is carried out at 110° C. for a further 3 hours. The clear, colorless acrylate resin solution thus obtained is then reacted with 81 parts of succinic anhydride at 120° C. to give the COOH-acrylate. The resulting acrylate resin solution has a viscosity of 7.2 dPa.s, a solids content of 52.3% and an acid number of 68.

Acrylate resin solution VII

The following are taken in a 3 l stainless steel kettle:

286 parts of xylene
286 parts of butyl acetate 98/100
143 parts of butan-2-ol

The initial mixture is heated up to 110° C. and feeds 1 and 2 are metered in uniformly in the course of 3 hours.

Feed 1

183 parts of methyl methacrylate
144 parts of β-carboxyethyl acrylate
136 parts of tert.-butyl acrylate
97 parts of divinylbenzene (isomer mixture, 62% in ethylstyrene)
80 parts of hydroxyethyl methacrylate
80 parts of n-butyl acrylate
44 parts of mercaptoethanol Feed 2

80 parts of vinylpyridine

Feed 3 is metered in over a period of 4 hours, all the feeds being started simultaneously and the temperature being kept at 110° C. during the polymerization.

Feed 3

27.2 parts of 2,2'-bisazo(2-methylbutyronitrile)
62 parts of xylene
62 parts of butyl acetate 98/100
31 parts of butan-2-ol When feed 3 has ended, after-polymerization is carried out at 110° C. for a further 2 hours. The clear acrylate resin solution thus obtained has a solids content of 50.5%, an acid number of 64.2 and a viscosity of 12.0 dPa.s.

Acrylate resin solution VIII

The following are taken in a 3 l stainless steel kettle:
479 parts of xylene
239 parts of dimethylformamide The initial mixture is heated up to 110° C. and feeds 1 and 2 are metered in uniformly in the course of 3 hours.

Feed 1

80 parts of dimethylaminoethyl methacrylate

Feed 2

183 parts of methyl methacrylate
80 parts of hydroxybutyl acrylate
47 parts of divinylbenzene (isomer mixture, 61% in ethylstyrene)
200 parts of tert.-butyl acrylate
80 parts of hydroxyethyl methacrylate
80 parts of n-butyl acrylate
44 parts of mercaptoethanol
0.24 part of hypophosphorous acid Feed 3 is metered in over a period of 4 hours. Feeds 1, 2 and 3 are started simultaneously.

Feed 3

27.2 parts of 2,2'-bisazo(2-methylbutyronitrile)
103 parts of xylene
51 parts of dimethylformamide The temperature is kept at 110° C. during the polymerization and, when feed 3 has ended, after-polymerization is carried out at 110° C. for a further 2 hours. Thereafter, 101 parts of maleic anhydride are added and an addition reaction with the hydroxyl groups of the copolymer is carried out at 100° C. until the acid number of 71 and a viscosity (original, 23° C.) of 8.2 dPa.s are reached. 340 parts of the solvent mixture are then distilled off and the residue is partly dissolved with 270 parts of butyl acetate 98/100. The resulting solution of a branched acrylate has a solids content of 56.6%, a viscosity of 13.5 dPa.s and an acid number of 70.5.

Acrylate resin IX

The following are taken in a 3 l stainless steel kettle:
480 parts of xylene
240 parts of dimethylformamide The initial mixture is heated up to 110° C. and feed 1 is metered in over a period of 3 hours:
160 parts of methyl methacrylate
80 parts of dimethylaminoethyl methacrylate
120 parts of n-butyl acrylate
200 parts of styrene
100 parts of 1,4-butanediol monoacrylate
80 parts of hydroxyethyl methacrylate
60 parts of hexamethylenebismethacrylamide
28 parts of mercaptoethanol (feed 1)

Feed 2 is metered in over a period of 4 hours. Feeds 1 and 2 are started simultaneously.

Feed 2

36 parts of tert.-butyl perethylhexanoate
96 parts of xylene
48 parts of dimethylformamide The temperature is kept at 110° C. during the polymerization. When feed 2 has ended, after-polymerization is carried out at 110° C. for a further 3 hours. 101 parts of maleic anhydride are then added at 100° C. and an addition reaction with the OH-acrylate is carried out until the acid number of 70 is reached. Thereafter, 227 parts of the solvent mixture are distilled off and 320 parts of n-butanol are added. The resulting solution of a branched acrylate resin has a solids content of 49.5%, an acid number of 68.3 and a viscosity of 18 dPa.s (original).

(B) Preparation of toning pastes

The pigment pastes were dispersed in a laboratory sand mill for 40 minutes in accordance with the following recipes (particle fineness 10 μm).

Paste 25/2

Acrylate resin II 36.0
Anti-sedimentation agent 1.5
Layered silicate 1.0
Lead molybdate pigment 50.0
Methoxypropyl acetate 13.0

Paste 25/3

Acrylate resin I 37.0
Anti-sedimentation agent 1.5
Titanium dioxide rutile pigment 53.0
Methoxypropyl acetate 8.5

Paste 25/4

Acrylate resin I 90.0
Copper phthalocyanine green pigment 8.0
Methoxypropyl acetate 2.0

(C) Preparation and testing of lacquers

Covering lacquers are prepared in accordance with the following recipes and are applied to glass plates by means of a doctor blade (dry coating thickness 40 μm), dried at room temperature or under forced conditions at 60° C. for 30 minutes, stored at room temperature for 6 days and then tested.

Pendulum hardness: According to König

Stability towards gasoline (FAM test fuel according to DIN 51604) and xylene: exposure for 5 minutes to a sheet of felt impregnated with the particular solvent, covered.

EXAMPLE 1

Acrylate resin I 43.9
Paste 25/3 43.9
Silicone solution 1.0
Epoxy resin based on bisphenol A with an epoxide equivalent weight of 190 6.5
Methoxypropyl acetate 4.7
Results:

| Drying: | 30 minutes at 60° C. | Room temperature |
|---|---|---|
| Pendulum hardness after 6 days: | 137 seconds | 101 seconds |
| Stability towards xylene after 6 days | O.K. | O.K. |
| Stability towards gasoline after 6 days | O.K. | O.K. |

EXAMPLE 2

Acrylate resin I 44.8
Paste 25/3 44.8
Silicone solution 1.0
3,4-Epoxy-cyclohexylmethyl-3,4-epoxycyclohexane carboxylate 4.4
Methoxypropyl acetate 5.0
Results:

| Drying: | 30' at 60° C. | Room temperature |
|---|---|---|
| Pendulum hardness after 6 days | 147 seconds | 109 seconds |
| Stability towards xylene after 6 days | O.K. | O.K. |
| Stability towards gasoline after 6 days | O.K. | O.K. |

EXAMPLE 3

Acrylate resin I 31.5
Paste 25/4 52.5
Silicone solution 1.3
Epoxy resin based on bisphenol A with an epoxide equivalent weight of 190 8.6
Methoxypropyl acetate 6.1
Results:

| Drying: | 30 minutes at 60° C. | Room temperature |
|---|---|---|
| Pendulum hardness after 6 days | 167 seconds | 111 seconds |
| Stability towards xylene after 6 days | O.K. | O.K. |
| Stability towards gasoline after 6 days | O.K. | O.K. |

EXAMPLE 4

Acrylate resin II 43.7
Paste 25/3 43.7
Silicone solution 1.0
Epoxy resin based on bisphenol A with an epoxide equivalent weight of 190 6.9
Methoxypropyl acetate 4.7
Results:

| Drying: | 30 minutes at 60° C. | Room temperature |
|---|---|---|
| Pendulum hardness after 6 days | 67 seconds | 72 seconds |
| Stability towards xylene after 6 days | O.K. | slight marking |
| Stability towards gasoline after 6 days | O.K. | slight marking |

EXAMPLE 5

Acrylate resin VII is mixed with a polyglycidyl ether based on sorbitol (epoxide equivalent weight 180) in a ratio of 82/18 (solid to solid) and the mixture is diluted with butyl acetate to 25″ DIN 4 and knife-coated onto glass sheets (wet film thickness 200 μm).

| Drying: | 30 minutes at 60° C. | Room temperature |
|---|---|---|
| Pendulum hardness after 3 days | 98″ | 81″ |
| Crosslinking test with methyl ethyl ketone (double wipe) | 200 double wipes | 200 double wipes |

EXAMPLE 6

Acrylate resin VII is mixed with a novolak polyglycidyl ether (epoxide equivalent weight 178) in a ratio of 82/18 (solid to solid) and the mixture is diluted with xylene and knife-coated onto glass sheets (200 μm wet film thickness). After drying at room temperature for 6 days, a pendulum hardness of 70″ is achieved. The result of the crosslinking test with methyl ethyl ketone is 155 double wipes.

We claim:
1. A soluble acrylate copolymer of monomer a1 with at least two polymerizable, olefinically unsaturated double bonds, monomer a2 carrying at least one function group selected from the group consisting of carboxylic acids, carboxylic esters, tertiary amines, carboxylic anhydrides, glycidyl esters and glycidyl ethers and other polymerizable monomers with an olefinically unsaturated double bond, wherein more than 5 to 30% by weight, based on the total weight of the monomers, of monomer a1 is copolymerized into the acrylate copolymer, the acrylate copolymer contains carboxyl groups and its acid number is 15 to 200.

2. A soluble acrylate copolymer as claimed in claim 1, produced from
(a1) more than 5 to 30% by weight of a monomer with at least two polymerizable, olefinically unsaturated double bonds,
(a2) 3 to 30% of a monomer containing carboxyl groups and
(a3) 40 to 93% by weight of other monomers with a polymerizable, olefinically unsatuated double bond, the sum of (a1), (a2), and (a3) being 100% by weight.

3. A soluble acrylate copolymer as claimed in claim 2, wherein 0.1 to 5% by weight, based on the total weight of all the monomers, of monomers with phosphoric acid groups are employed as part of the other monomers a3 with a polymerizable, olefinically unsaturated double bond.

4. A soluble acrylate copolymer as claimed in claim 1, which can be obtained from
   (a1) more than 5 to 30% by weight of a monomer with at least two polymerizable, olefinically unsaturated double bonds, which is other than di- and polyesters of di- and polyols with acrylic acid,
   (a2) 3 to 30% by weight of a monomer containing carboxyl groups,
   (a3) 0.1 to 20% by weight of a tertiary amine with a polymerizable, olefinically unsaturated double bond,
   (a4) 0 to 40% by weight of a monomer containing hydroxyl groups and
   (a5) 0 to 80% by weight of other monomers with a polymerizable, olefinically unsaturated double bond, the sum of components (a1), (a2), (a3), (a4), and (a5) being 100% by weight.

5. A soluble acrylate copolymer as claimed in claim 4, wherein 0.1 to 5% by weight, based on the total weight of all the monomers, of monomers with phosphoric acid groups are employed as part of the other monomers a5 with a polymerizable, olefinically unsaturated double bond.

6. A soluble acrylate copolymer as claimed in claim 1, which is produced from: a pre-crosslinked non-gelled product of
   (a1) more than 5 to 30% by weight of a monomer with at least two polymerizable, olefinically unsaturated double bonds, which is other than di- and polyesters of di- and polyols with acrylic acid,
   (a2) 0.1 to 20% by weight of a tertiary amine with a polymerizable, olefinically unsaturated double bond,
   (a3) 5 to 40% by weight of monomers containing hydroxyl groups,
   (a4) 0 to 80% by weight of other polymerizable monomers with an olefinically unsaturated double bond, which pre-crosslinked non-gelled product is reacted with
   (a5) cyclic carboxylic acid anhydride the sum of (a1), (a2), (a3) and (a4) in the pre-crosslinked non-gelled product being 100% by weight.

7. A soluble acrylate copolymer as claimed in claim 1, which is produced from: a pre-crosslinked non-gelled product of
   (a1) more than 5 to 30% by weight of a monomer with at least two polymerizable, olefinically unsaturated double bonds,
   (a2) 1 to 25% by weight of monomers with cyclic carboxylic acid anhydride groups,
   (a3) 45 to 80% by weight of other polymerizable monomers with an olefinically unsaturated double bond, the sum of (a1), (a2) and (a3) in the pre-crosslinked non-gelled product being 100% by weight, which pre-crosslinked non-gelled product is reacted with
   (a4) compounds which contain both at least one hydrogen which can react with acid anhydride groups and at least one tertiary amino group.

8. Soluble acrylate copolymer as claimed in claim 7, wherein component (a4) is an alcohol which contains a tertiary amino group.

9. Soluble acrylate copolymer as claimed in claim 7 or 8, wherein component (a4) is a primary or secondary amine with a tertiary amino group.

10. A soluble acrylate copolymer as claimed in claim 1, which is produced from: a pre-crosslinked non-gelled product of
    (a1) more than 5 to 30% by weight of monomers with at least two polymerizable, olefinically unsaturated double bonds,
    (a2) 1 to 30% by weight of glycidyl esters of ethylenically unsaturated carboxylic acids and/or glycidyl ethers of olefinically unsaturated compounds,
    (a3) 40 to 9% by weight of other polymerizable monomers with an olefinically unsaturated double bond, the sum of all the monomers being 100% by weight, which pre-crosslinked non-gelled product is reacted with
    (a4) amines with a secondary amino group or di- or polyamines with at least one tertiary amino group and one primary or secondary amino group, and/or
    (a5) carboxylic acids which contain a tertiary nitrogen atom, and
    (a6) cyclic carboxylic acid anhydrides.

11. Soluble acrylate copolymer as claimed in claim 4, 5 or 6, wherein the monomer with at least 2 polymerizable, olefinically unsaturated double bonds corresponds to the formula $$CH_2=C\underset{\underset{CH_3}{|}}{\overset{\overset{O}{\|}}{-}}C-X-(CH_2)_n-X-\overset{\overset{O}{\|}}{C}-\underset{\underset{CH_3}{|}}{C}=CH_2$$

in which: $X=O$, $NR'$ or $S$, where $R'=H$, alkyl or aryl, and $n=2$ to 8.

12. Soluble acrylate copolymer as claimed in claim 2, 3, 7, 8 or 10, wherein the monomer with at least two polymerizable, olefinically unsaturated double bonds corresponds to the general formula $$CH_2=C\underset{\underset{R}{|}}{\overset{\overset{O}{\|}}{-}}C-X-(CH_2)_n-X-\overset{\overset{O}{\|}}{C}-\underset{\underset{R}{|}}{C}=CH_2$$

in which: $R=H$ or $CH_3$, $X=O$, $NR'$ or $S$, where $R'=H$, alkyl or aryl, and $n=2$ to 8.

13. Soluble acrylate copolymer as claimed in claim 4, 5 or 6, wherein the monomer with at least two polymerizable, olefinically unsaturated double bonds is a reaction product of a carboxylic acid with a polymerizable, olefinically unsaturated double bond, excluding acrylic acid, and glycidyl methacrylate.

14. Soluble acrylate copolymer as claimed in claim 2, 3, 7, 8 or 10, wherein the monomer with at least two polymerizable, olefinically unsaturated double bonds is a reaction product of a carboxylic acid with a polymerizable, olefinically unsaturated double bond and glycidyl acrylate and/or glycidyl methacrylate.

15. Soluble acrylate copolymer as claimed in claim 4, 5 or 6, wherein the monomer with at least two polymerizable, olefinically unsaturated double bonds is a polycarboxylic acid or unsaturated monocarboxylic acid esterified with an unsaturated alcohol containing a polymerizable double bond, excluding derivatives of acrylic acid.

16. Soluble acrylate copolymer as claimed in claim 2, 3, 7, 8 or 10, wherein the monomer with at least two polymerizable, olefinically unsaturated double bonds is a polycarboxylic acid or unsaturated monocarboxylic acid esterified with an unsaturated alcohol containing a polymerizable double bond.

17. Soluble acrylate copolymer as claimed in claim 1 to 8 and 10, wherein the monomer with at least two polymerizable, olefinically unsaturated double bonds can be prepared by reaction of a polyisocyanate with alcohols or amines containing unsaturated, polymerizable double bonds.

18. Soluble acrylate copolymer as claimed in claim 4, 5 or 6, wherein the monomer with at least two polymerizable, olefinically unsaturated double bonds is a diester of polyethylene glycol and/or polypropylene glycol with an average molecular weight of less than 1500 and methacrylic acid.

19. Soluble acrylate copolymer as claimed in claim 2, 3, 7, 8 or 10, wherein the monomer with at least two polymerizable, olefinically unsaturated double bonds is a diester of polyethylene glycol and/or polypropylene glycol with an average molecular weight of less than 1500 and acrylic acid and/or methacrylic acid.

20. Soluble acrylate copolymer as claimed in claim 2, 3, 4 or 5, wherein the monomer containing carboxyl groups (component a2) is β-carboxyethyl acrylate.

21. A soluble acrylate copolymer as claimed in claim 4, 5 or 6, wherein the reaction product of acrylic acid or methacrylic acid or a mixture thereof with the glycidyl ester of a carboxylic acid with a tertiary alpha-carbon atom is employed as the monomer containing hydroxyl groups.

22. Soluble acrylate copolymer as claimed in claim 1 to 21, wherein the other polymerizable monomers with an olefinically unsaturated double bond ar chosen from the group comprising styrene, vinyltoluene, alkyl esters of acrylic acid and methacrylic acid, alkoxyethyl acrylates and aryloxyethyl acrylates and the corresponding methacrylates and esters of maleic and fumaric acid.

23. Soluble acrylate copolymer as claimed in claim 1 to 8 and 10, wherein the polymerization is carried out in the presence of a chlorinated polyolefin, the ratio of acrylate to polyolefin being 98:2 to 30:70.

24. Process for the preparation of the soluble acrylate copolymer as claimed in claim 2, 3, 4 or 5, wherein, for preparation of the copolymer, the monomers are copolymerized in an organic solvent at 70° C. to 130° C., preferably at 80° C. to 120° C., using at least 0.5% by weight, based on the total weight of the monomers, of a polymerization regulator and using polymerization initiators to give a pre-crosslinked, non-gelled product.

25. Process for the preparation of the soluble acrylate copolymer as claimed in claim 6, wherein, for preparation of the copolymer, the monomers are first copolymerized in an organic solvent at 70° C. to 130° C. using at least 0.5% by weight based on the total weight of all the monomers, of a polymerization regulator and using polymerization initiators, to give a pre-crosslinked, non-gelled product and, when the copolymerization has ended, the reaction with the cyclic carboxylic acid anhydrides (a5) is carried out.

26. Process for the preparation of the soluble acrylate copolymer as claimed in claim 7, 8 or 9, wherein, for preparation of the copolymer, the monomers are first copolymerized in an organic solvent at 70° C. to 130° C. using at lest 0.5% by weight based on the total weight of the monomers, of a polymerization regulator and using polymerization initiators, to give a pre-crosslinked, non-gelled product and, when the copolymerization reaction has ended, the pre-crosslinked nongelled product is reacted with the compounds (a4).

27. Process for the preparation of the soluble acrylate copolymer as claimed in claim 10, wherein for preparation of the copolymer, the monomers are first copolymerized in an organic solvent at 70° C. to 130° C. using at least 0.5% by weight based on the total weight of monomers, of a polymerization regulator and using polymerization initiators, to give a pre-crosslinked, non-gelled product and, when the copolymerization reaction has ended, the reaction of the pre-crosslinked, non-gelled product with amines (a4) or with carboxylic acids (a5) or a mixture thereof.

28. Process as claimed in claim 24, 25 or 26, wherein compounds containing mercapto groups, are used as polymerization regulators.

29. Process as claimed in claim 26, wherein compounds containing mercapto groups, apart from mercaptans with primary SH groups, are used as regulators.

30. Process as claimed in claim 24 to 27, wherein azo compounds or peroxyesters are used as initiators.

31. Process as claimed in claim 24 to 27, wherein the polymerization for the preparation of the acrylate copolymer is carried out so that a solution of the polymer with a solids content of 40 to 65% by weight results.

32. A coated substrate wherein the coating is a hardened composition of:
(A) an acrylate copolymer prepared according to any of claims 24 to 27, and
(B) a mixture of a compound containing at least two epoxide groups per molecule and ingredients selected from the group consisting of crosslinking catalysts, organic solvents, pigments, dispersion additives and mixtures thereof,
the ratio of (A) and (B) being chosen so that the ratio of acid groups of (A) to the epoxide groups of (B) is in the range of from about 0.5:3 to about 2:0.5.

33. A copolymer of claim 7 where (a4) also includes monofunctional compounds with active hydrogen which are capable of reacting with the carboxylic anhydride groups.

34. A process according to claim 26 wherein the pre-crosslinked non-gelled product is also reacted with monofunctional compounds with active hydrogen.

* * * * *